United States Patent [19]

LeBlanc

[11] Patent Number: 4,930,224
[45] Date of Patent: Jun. 5, 1990

[54] MAGNETIC COMPASS

[75] Inventor: Kenneth LeBlanc, Gloucester, Mass.

[73] Assignee: Rule Industries, Inc., Gloucester, Mass.

[21] Appl. No.: 231,890

[22] Filed: Aug. 12, 1988

Related U.S. Application Data

[63] Continuation-in-part of Ser. No. 59,567, Jun. 8, 1987, abandoned.

[51] Int. Cl.$^5$ ............................................. C01C 17/14
[52] U.S. Cl. ..................................... 33/355 D; 33/364
[58] Field of Search ................................... 33/355–359, 33/364, 352, 346, 319

[56] References Cited

U.S. PATENT DOCUMENTS

| | | | |
|---|---|---|---|
| 1,877,455 | 9/1932 | Gordon | 33/348 |
| 2,017,900 | 10/1935 | Grant | 33/348 |
| 2,127,807 | 8/1938 | Carbonara | 33/348 |
| 2,181,444 | 11/1939 | Zook | 33/348 |
| 3,079,698 | 3/1963 | Hull | 33/364 |
| 3,199,210 | 8/1965 | Ledgerwood | 33/364 |
| 3,481,045 | 12/1969 | White | 33/364 |
| 3,502,857 | 3/1970 | Cleveland et al. | 33/364 |
| 3,585,728 | 6/1971 | Ogg | 33/355 |
| 3,690,014 | 9/1972 | Giltzow | 33/346 |
| 3,949,483 | 4/1976 | White | 33/364 |
| 4,089,118 | 5/1978 | Howard | 33/355 |
| 4,175,333 | 11/1979 | Kramer | 33/355 |
| 4,357,756 | 11/1982 | DeGaeta et al. | 33/355 |
| 4,359,823 | 11/1982 | White | 33/364 |
| 4,571,843 | 2/1986 | Lindskog | 33/355 |
| 4,656,751 | 4/1987 | White et al. | 33/356 |

FOREIGN PATENT DOCUMENTS

| | | | |
|---|---|---|---|
| 2313521 | 10/1974 | Fed. Rep. of Germany | 33/355 |
| 2002901 | 2/1979 | United Kingdom | 33/355 |

Primary Examiner—William A. Cuchlinski, Jr.
Assistant Examiner—Patrick R. Scanlon
Attorney, Agent, or Firm—Fish & Richardson

[57] ABSTRACT

An improved magnetic compass unit consists of a compass bowl, a card assembly pivotally supported on a pivot shaft within the bowl, the card assembly consisting of a compass card and a magnet, and at least one active indicator pin adapted for alignment with the lubber line of a supporting vehicle and with an adjacent degree indicia line upon the compass card. The active indicator pin is mounted to pivot apart from the pivotally mounted compass assembly, whereby the indicator pin remains disposed generally in a common plane with the adjacent degree indicia line during conditions of compass roll. The card assembly may be with or without gimbal mounting.

9 Claims, 3 Drawing Sheets

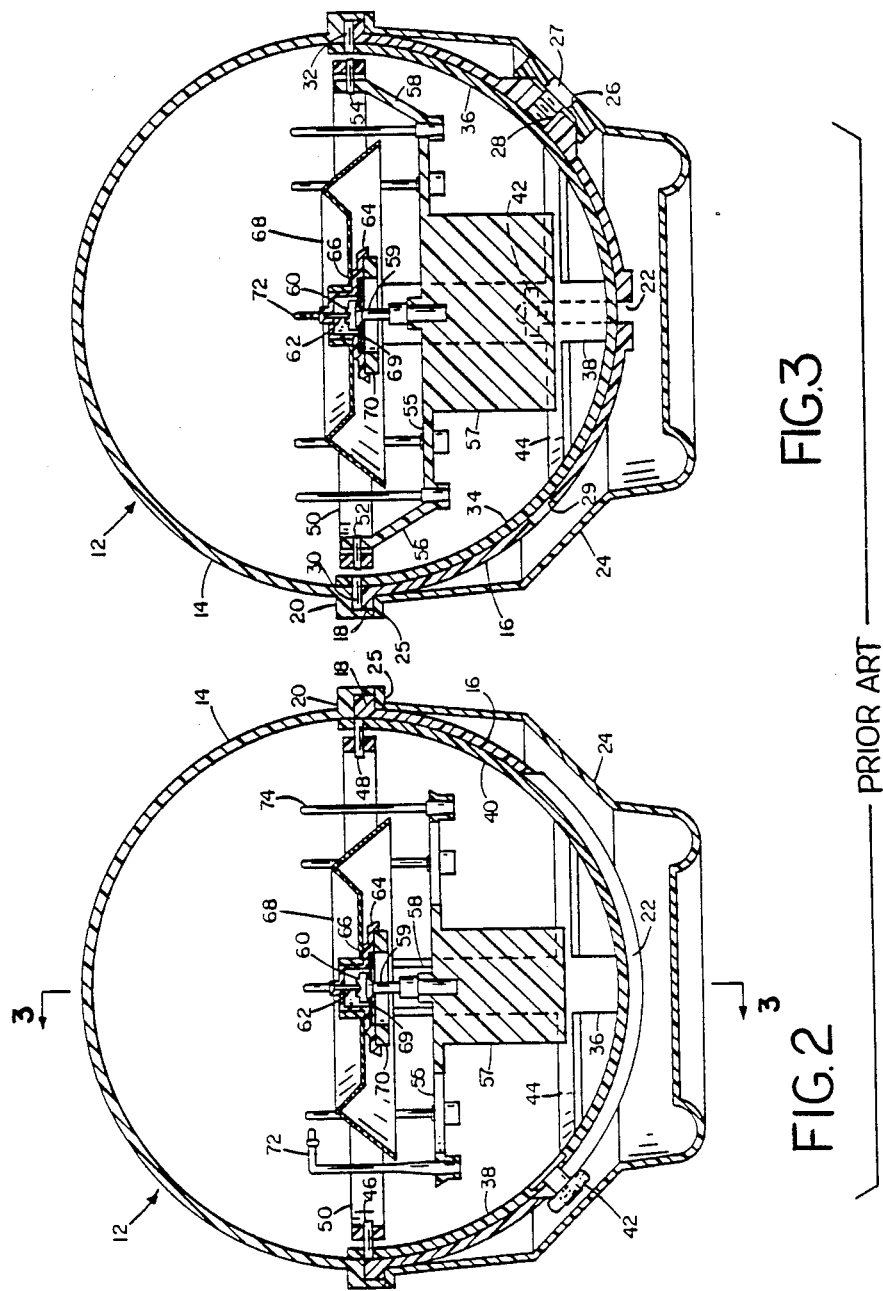

MAGNETIC COMPASS

This application is a continuation-in-part of U.S. application Ser. No. 059,567, filed June 8, 1987 and now abandoned.

The invention relates to compasses.

A compass for use aboard ship or in an airplane includes indicator pins defining the lubber line or principal axis of the compass aligned with the longitudinal axis of the vehicle. The compass for use in such vehicles typically includes a compass card mounted in a gimbal frame that suspends the card to remain level when its support, i.e., the vehicle, is tipped. Ideally, for accurate compass readings, the motion of the lubber line indicator pins follows the motion of the card so the lubber line pins remain parallel to the card degree lines as much as possible. Typically, this is accomplished by attaching the lubber line pins to the gimbal frame supporting the card. In this manner, the card and lubber line pins are made to move in unison under conditions of compass roll, but the assembly requires an additional labor step of balancing the frame after the pins are attached.

Other, less expensive compasses may have fixed lubber line indicator pins that do not move with the compass card which avoids the labor of balancing the frame, but at the cost of reduced reading accuracy.

SUMMARY OF THE INVENTION

According to one aspect of the invention, an improved magnetic compass unit comprises a compass bowl, a card assembly pivotally supported on a pivot shaft within the bowl, the card assembly comprising a compass card and a magnet, and at least one active indicator pin adapted for alignment with the lubber line of a supporting vehicle and with an adjacent degree indicia line upon the compass card, the active indicator pin being mounted to pivot apart from the pivotally mounted compass assembly and to pivot apart from the pivot shaft, whereby the indicator pin remains disposed generally in a common plane with the adjacent degree indicia line during conditions of compass roll.

According to another aspect of the invention, an improved magnetic compass unit comprises a compass bowl, a card assembly pivotally supported on a pivot shaft within the bowl, without gimbal mounting, the card assembly comprising a compass card and a magnet, and at least one active indicator pin adapted for alignment with the lubber line of a supporting vehicle and with an adjacent degree indicia line upon the compass card, the indicator pin being mounted to pivot apart from the pivotally mounted compass assembly and to pivot apart from the pivot shaft, whereby the indicator pin remains disposed generally in a common plane with the adjacent degree indicia line during conditions of compass roll.

In preferred embodiments of these aspects the invention, the active indicator pin is mounted to pivot about a trunnion pin; the indicator pin comprises a paddle portion disposed in a plane which extends through the longitudinal axis of the trunnion pin, the paddle portion adapted to dampen rotation motion of the indicator pin about the trunnion pin.

In another embodiment of the invention, an improved magnetic compass unit comprises a compass bowl, a gimbal mount within the bowl comprising a gimbal frame and gimbal cage comprising a multiplicity of gimbal arms, a card assembly pivotally supported on a pivot shaft within the bowl, the card assembly comprising a compass card and a magnet, and at least one active indicator pin adapted for alignment with the lubber line of a supporting vehicle and with an adjacent degree indicia line upon the compass card, the active indicator pin being mounted to pivot apart from the gimbal frame and the gimbal cage, to pivot apart from the pivot shaft and to pivot apart from the card assembly, whereby the indicator pin remains disposed generally in a common plane with said adjacent degree indicia line during conditions of compass roll.

In preferred embodiments of this aspect of the invention, the active indicator pin is mounted to pivot about a trunnion pin extending from the gimbal cage and preferably the indicator pin comprises a paddle portion disposed in a plane which extends through the longitudinal axis of the trunnion pin, the paddle portion adapted to dampen rotational motion of the indicator pin about the trunnion pin.

In preferred embodiments of the invention, the compass further comprises a pivot bearing, and the compass card assembly further comprises the pivot shaft, the pivot shaft and the compass card being mounted as a unit to pivot upon the bearing.

There is thus provided a compass having "active" lubber line indicator pins that remain vertical under conditions of lateral compass roll, without mounting on the gimbal frame or compass card, for enhanced accuracy of compass reading, without the additional step of balancing the frame or card.

Other features and advantages of the invention will be apparent from the following description of a preferred embodiment and from the claims.

PREFERRED EMBODIMENT

We first briefly describe the drawings.

Drawings

FIGS. 2 and 3 are side section views of a prior art compass having lubber line indicator pins mounted on the gimbal frame, FIG. 3 taken at the line 3-3 of FIG. 2;

Figure 1:
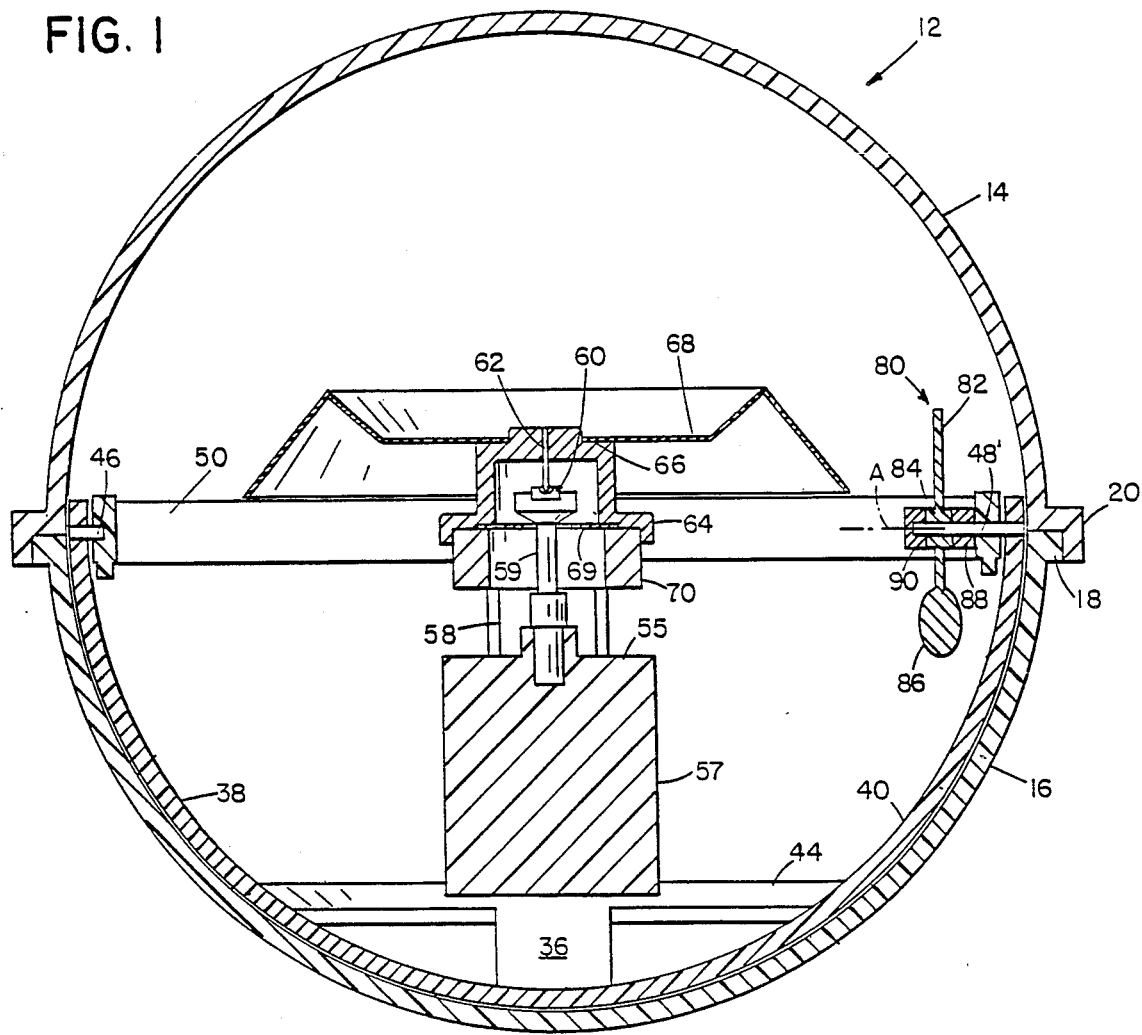
FIG. 1 is a somewhat diagrammatic side section view of a gimbal-mounted compass provided with an active lubber line indicator pin of the invention.

Referring to FIG. 2 and 3, a typical compass, e.g., as disclosed in U.S. Pat. No. 4,656,751, issued Apr. 14, 1987, consists of a compass unit 12 supported in a housing (not shown). The compass unit includes a pair of transparent hemispherical bowls 14, 16, e.g., made of cellulose acetate propionate. The lower bowl 16 has a flange 18 extending outwardly about its periphery. The upper bowl or dome 14 also has a flange 20 extending outwardly about its periphery, engaging the facing surface of flange 18, and extending downwardly about and engaging the periphery of flange 18. Referring to FIGS. 2 and 3, the lower bowl 16 has an elongated slot 22 along its bottom, enclosed by a flexible membrane 24, made of neoprene, extending from a flange 25 of membrane material positioned under the lower side of flanges 18, 20. As shown in FIG. 3, membrane 24 has a fill port 26, aligned with and adhesively secured about a port 28 in the lower bowl 16, through which suitable damping liquid can be introduced into the compass unit 12 and air can be evacuated therefrom. Membrane 24 permits expansion and contraction of liquid within the compass, due to temperature or pressure change, without formation of bubbles, as is known in the art. Ports 26, 28 are closed by threaded brass fitting 27. Hole 29 in bowl 16 assures unrestricted flow of liquid between the interior of bowls 14, 16 and the exterior space about lower bowl 16 enclosed by membrane 24.

A gimbal mount is provided within the compass bowl. As illustrated in FIG. 3, a pair of pivot pins 30, 32 are disposed in diametrically opposed recesses in flange 18, flange 20 of the upper bowl overlying the recesses and the pins 30, 32, and enclosing the outer ends of the pins. The pins are rotatably supported within the recesses in flange 18. The pins 30, 32 pivotally support the gimbal cage consisting of arms 34, 36, 38, 40. Two arms 34, 36 of the gimbal support extend from pins 30, 32 in semicircular fashion about the bottom of lower bowl 16. At right angles to arms 34, 36, as shown in FIGS. 1 and 2, the gimbal cage arms 38, 40 extend in a semicircle about the bottom of bowl 16 in line with slot 22. Arm 38 is provided with a friction lock member 42 extending on a shaft, through slot 22, and frictionally engaging the outside of bowl 16 to adjustably position the gimbal cage, as disclosed in U.S. Pat. No. 3,949,483, also incorporated by reference herein. The arms 34, 36, 38, 40 of the gimbal cage are interconnected by an integral circular rib 44 extending therebetween, below lock member 42 in arm 38. A pair of pivot pins 46, 48, in the same plane as pins 30, 32, pivotally support a gimbal ring 50. Ring 50 extends in a continuous circle about the interior of the compass bowl. The gimbal cage and the gimbal ring are made of rigid transparent plastic material, e.g., clear acrylic.

At a right angle to pins 46, 48, in the same plane as pins 30, 32, 46, 48 with the pins 30, 32 in horizontal alignment, as shown in FIG. 3, pivot pins 52, 54 pivotally support gimbal frame 55, depending from arms 56, 58, below the compass equator and below pins 52, 54. An integral damping baffle or weight 57 extends below frame 55. A bearing shaft 59 extends upwardly from frame 55 on the vertical axis of compass supporting a jewel pivot bearing 60. A pivot shaft 62 is pivotally supported on the bearing 60. An inverted cup member 64 is connected to the upper end of pivot shaft 62 and has a radially extending surface 66. Supported on the surface 66 is a compass card 68. (In the prior art compass of FIGS. 2 and 3, the jewel pivot bearing is supported at the equatorial plane of the compass, defined by pins 30, 32, 46, 48, 52, 54 with the axes of pins 30, 32 and 46, 48 in a horizontal position; and surface 66 is preferably closely adjacent or, as illustrated, in the equatorial plane.) The direct read card illustrated extends radially outwardly and is then angled a short distance upwardly and then downwardly (In the prior art device, with surface 66 at least adjacent the compass equatorial plane, upwardly angled surface extends above the plane, and the downwardly angled surface extends below the equatorial plane of the compass.) Indicia, not shown, are printed on the outside of the downwardly extending portion of the card 68. An annular magnet 70 of permanent magnetic material is supported below cup member 64, with the North pole thereof at the South pole marked on the card 68. Disc 69, press fitted into a recess on the lower side of member 64, extends under the enlarged bearing 60 to adjacent bearing shaft 59 capturing the card assembly to the bearing shaft. In the illustrated embodiment, the mass of the card assembly, consisting of shaft 62, member 64, card 68, disc 69 and magnet 70, below the pivot bearing at the equatorial plane is at least as great as the mass above the bearing.

In prior art compasses, e.g., as shown in Figs. 2 and 3, gimbal frame 55 also supports indicator pins including pins 72, 74 defining the lubber line or principal axis of the compass; pins 72, 74 are mounted in line with pivot pins 46, 48, the lubber line being at a right angle to the axis of the other pins 30, 32, 52, 54. In order that the lubber line indicator pins extend vertically, with the compass card level and the pins parallel to the degree indicia, the frame is carefully balanced prior to assembly. This is done by mounting the frame in air, and adding weights about the frame until the card is level and the pins are vertical.

In one embodiment of the compass of the invention, the lubber line indicator pin remains disposed generally in a common plane with the adjacent degree indicia line on the compass card during conditions of compass roll, but is not mounted on the gimbal frame. The compass assembly is pendulous, and the compass can therefore be assembled without the additional step of balancing the frame, required in prior art compasses.

Figure 4:
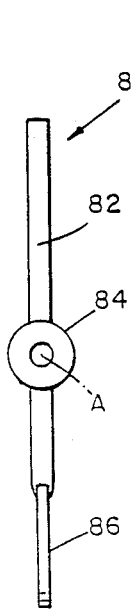
FIGS. 4 and 5 are face and side view of a lubber line pin of the invention.
Figure 5:
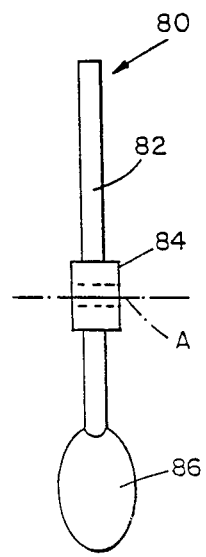

Referring now to FIGS. 1, 4, and 5, active lubber line indicator pin 80 of the invention consists of an indicator shaft 82, a sleeve portion 84, and a paddle 86. The compass 10 of the invention has an elongated pivot pin 48', supported in arm 40 of the gimbal cage and extending radially inwardly through gimbal ring 50. The sleeve 84 of the indicator pin 80 is disposed upon pivot pin trunnion 48', between spacer 88 and end cap 90, in a manner to allow the indicator pin to pivot freely about the trunnion axis, A, in response to sideways or lateral roll of the vehicle, and generally in unison with roll of compass card 68. The paddle 86 serves to counterbalance the indicator shaft 82 about axis A, to keep the shaft extending generally upwardly, and also serve to dampen rotational motion of the indicator pin.

Figure 1A:
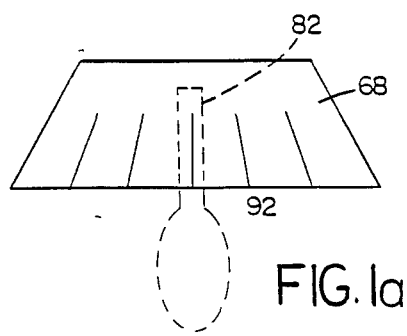
FIGS. 1a and 1b are somewhat diagrammatic face and plan views of the compass card and active indicator pin of the invention, showing the relationship of the pin and adjacent degree indicia line.
Figure 1B:
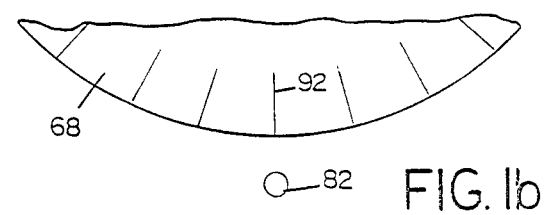

The compass unit 12 of the invention is mounted, e.g., on a sailboat, with the active indicator pin 80 aligned with the lubber line, e.g., the longitudinal axis, of the boat. In use, as the sailboat heels over and the surface on which the compass is mounted tilts, the gimbal cage acts to maintain the compass assembly substantially level, i.e., horizontal. The active lubber line indicator pin 80 pivots about the axis A of the trunnion 48' as the boat heels over, with the the pivoting motion dampened, e.g., to avoid rocking, by engagement of the paddle 86 in the liquid within the compass bowl. The compass card assembly (in the gimbal cage) and the indicator pin are mounted apart from each other, but move generally in unison, the pin remaining generally in a common plane with the adjacent degree indicia line on the compass card 68, e.g., as shown in FIGS. 1a and 1b, in which the adjacent degree indicia 92 is seen to lie generally in a common plane with the shaft 82 (shown in dashed line in FIG. 1a) of active indicator pin 80.

Figure 6:
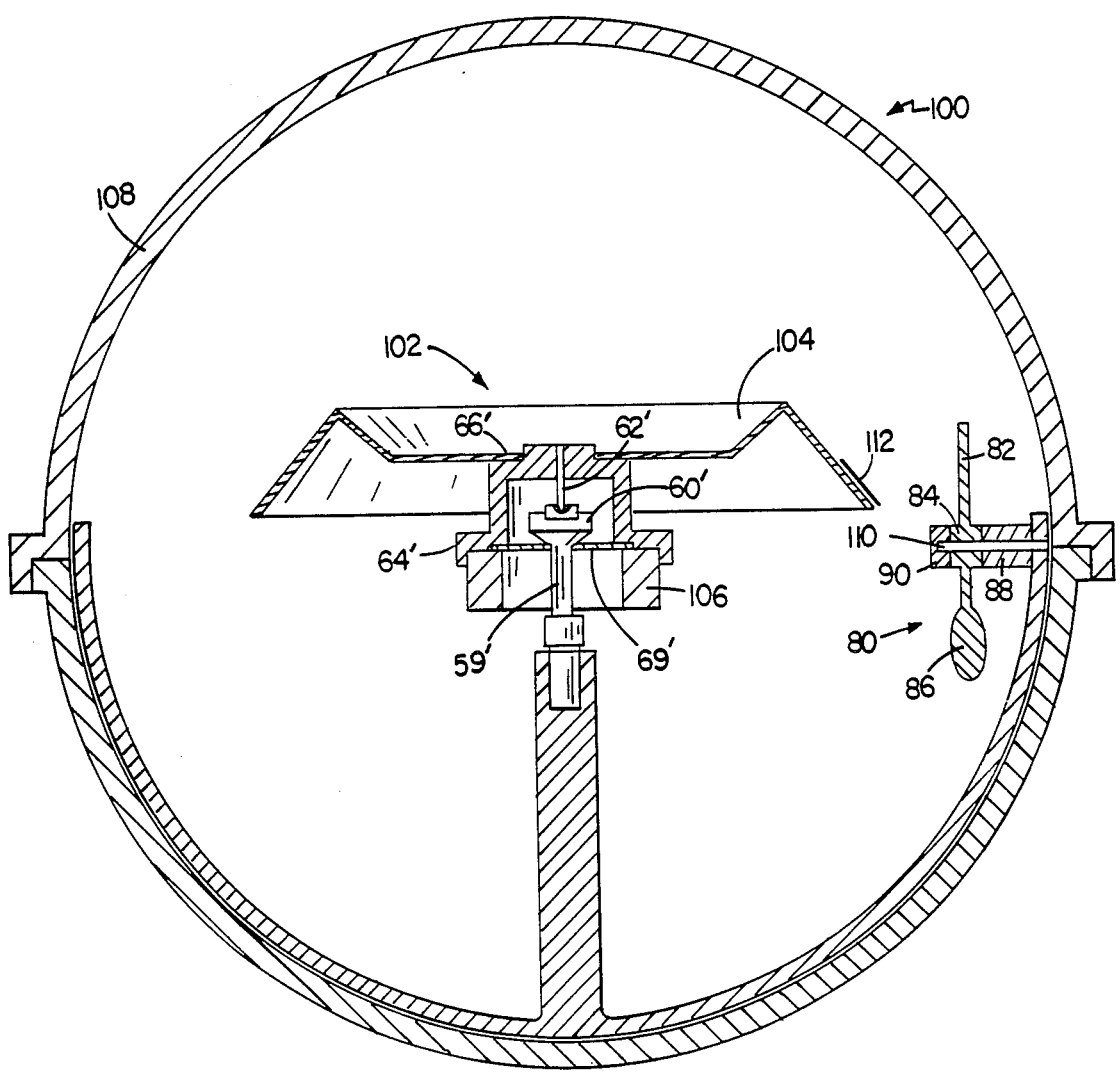
FIG. 6 is a somewhat diagrammatic side section view of another compass provided with an active lubber line indicator pin of the invention.

Referring now to FIG. 6, another compass 100 equipped with the active indicator pin 80 of the invention is shown. Compass 100 consists of a compass assembly 102 (compass card 104 and magnet 106) pivotally mounted in a compass bowl 108, without gimbal-mounting. (The other components of the compass mounting are generally as described above with reference to FIG.

1, and are indicated by similar reference numerals.) Compass 100 is of the type used in vessels, e.g., power boats, which are subject to a lesser degree of heeling over than sailboats. Active indicator pin 80 of the invention is mounted apart from the compass assembly in a manner whereby as the compass assembly rolls to remain vertical as the boat heels, e.g., in a turn, the active lubber line indicator pin 80 pivots about trunnion 110 to remain disposed generally in a common plane with the adjacent degree indicia line 112 on the compass card 104.

These and other embodiments are within the following claims. For example, two indicator pins, disposed on fore and aft trunnions, may be employed.

I claim:

1. In a magnetic compass unit comprising a compass bowl, a card assembly pivotally supported on a pivot shaft within said bowl, said card assembly comprising a compass card and a magnet, a bearing member defining a pivot bearing, said card assembly mounted to pivot upon said pivot bearing, and at least one active indicator pin adapted for alignment with the lubber line of a supporting vehicle and with an adjacent degree indicia line upon said compass card, the improvement wherein
said active indicator pin is mounted to pivot apart from said card assembly, to pivot apart from said bearing member, and to pivot apart from said pivot shaft, whereby said indicator pin remains disposed generally in a common plane with said adjacent degree indicia line during conditions of compass roll.

2. In a non-gimballed magnetic compass unit comprising a compass bowl, a card assembly pivotally supported on a pivot shaft within said bowl, said card assembly comprising a compass card and a magnet, a bearing member defining a pivot bearing, said card assembly mounted to pivot upon said pivot bearing, and at least one active indicator pin adapted for alignment with the lubber line of a supporting vehicle and with an adjacent degree indicia line upon said compass card, the improvement wherein
said active indicator pin is mounted to pivot apart from said card assembly, to pivot apart from said bearing member, and to pivot apart from said pivot shaft, whereby said indicator pin remains disposed generally in a common plane with said adjacent degree indicia line during conditions of compass roll.

3. The magnetic compass of claim 1 or 2 wherein said active indicator pin is mounted to pivot about a trunnion pin.

4. The magnetic compass of claim 3 wherein said indicator pin comprises a paddle portion disposed in a plane which extends through the longitudinal axis of said trunnion pin, said paddle portion adapted to dampen rotational motion of said indicator pin about said trunnion pin.

5. The magnetic compass of claim 1 or 2 wherein said compass pivot shaft and said compass card are mounted to pivot as a unit upon said pivot bearing.

6. In a magnetic compass unit comprising a compass bowl, a gimbal mount within said bowl comprising a gimbal frame and gimbal cage comprising a multiplicity of gimbal arms, a card assembly pivotally supported on a pivot shaft within said bowl, said card assembly comprising a compass card and a magnet, and at least one active indicator pin adapted for alignment with the lubber line of a supporting vehicle and with an adjacent degree indicia line upon said compass card, the improvement wherein
said active indicator pin is mounted to pivot apart from said gimbal frame and said gimbal cage, to pivot apart from said pivot shaft and to pivot apart from said card assembly, whereby said indicator pin remains disposed generally in a common plane with said adjacent degree indicia line during conditions of compass roll.

7. The magnetic compass of claim 6 wherein said active indicator pin is mounted to pivot about a trunnion pin extending from said gimbal cage.

8. The magnetic compass of claim 7 wherein said indicator pin comprises a paddle portion disposed in a plane which extends through the longitudinal axis of said trunnion pin, said paddle portion adapted to dampen rotational motion of said indicator pin about said trunnion pin.

9. The magnetic compass of claim 6 wherein said compass further comprises a pivot bearing, and said pivot shaft and said compass card are mounted to pivot as a unit upon said pivot bearing.

* * * * *